(12) United States Patent
Fuesting

(10) Patent No.: US 12,509,990 B2
(45) Date of Patent: Dec. 30, 2025

(54) DUAL-WALLED COMPONENTS FOR A GAS TURBINE ENGINE

(71) Applicant: Rolls-Royce Corporation, Indianapolis, IN (US)

(72) Inventor: Timothy Paul Fuesting, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/750,076

(22) Filed: Jun. 21, 2024

(65) Prior Publication Data
US 2025/0389192 A1 Dec. 25, 2025

(51) Int. Cl.
*F01D 5/14* (2006.01)
*F01D 5/18* (2006.01)
*F01D 5/28* (2006.01)

(52) U.S. Cl.
CPC .............. *F01D 5/147* (2013.01); *F01D 5/18* (2013.01); *F01D 5/28* (2013.01); *F05D 2230/21* (2013.01); *F05D 2300/17* (2013.01)

(58) Field of Classification Search
CPC .............. B23K 35/3033; B23K 20/026; F05D 2220/32; F05D 2260/202; F05D 2260/201; F05D 2230/80; F05D 2240/12; F05D 2230/31; F05D 2230/40; F05D 2260/22141; F05D 2230/21; F05D 2300/17; F05D 2230/236; F01D 5/147; F01D 5/187; F01D 5/186; F01D 9/041; F01D 25/12; F01D 5/005; F01D 5/18; F01D 5/28; B23P 15/04; B23P 6/002; B23P 6/005; B23P 6/045; B23P 6/007; B23P 15/006
See application file for complete search history.

(56) References Cited

U.S. PATENT DOCUMENTS

| | | | |
|---|---|---|---|
| 5,836,075 A | 11/1998 | Fitzgerald et al. | |
| 6,638,639 B1 * | 10/2003 | Burke | B23K 20/023 |
| | | | 428/606 |

(Continued)

FOREIGN PATENT DOCUMENTS

EP 0561179 A2 * 9/1993 ............. C22C 19/05

OTHER PUBLICATIONS

Voyiadjis, George Z. and Yaghoobi, Mohammadreza. Size Effects in Plasticity, Chapter 3—Nonlocal crystal plasticity, Academic Press, 2019, pp. 191-232, https://www.sciencedirect.com/science/article/abs/pii/B9780128122365000037. (Year: 2019).*

(Continued)

*Primary Examiner* — Eric J Zamora Alvarez
(74) *Attorney, Agent, or Firm* — Shumaker & Sieffert, P.A.

(57) ABSTRACT

A dual-walled component of a gas turbine engine includes a cold section part, such as a spar, and a hot section part, such as a coversheet. The cold section part includes a single crystal or directionally solidified metal alloy and defines an outer surface, a hot section part comprising a polycrystalline metal alloy formed using additive manufacturing. The hot section part includes a plurality of support structures forming a plurality of cooling channels and defining an inner surface. The outer surface of the cold section part and the inner surface of the plurality of support structures are diffusion bonded.

20 Claims, 2 Drawing Sheets

(56) References Cited

U.S. PATENT DOCUMENTS

| | | | | |
|---|---|---|---|---|
| 8,100,654 | B1* | 1/2012 | Liang | F01D 5/187 |
| | | | | 416/97 R |
| 10,465,526 | B2* | 11/2019 | Barker | F01D 5/187 |
| 10,648,341 | B2* | 5/2020 | Barker | F01D 9/065 |
| 10,801,094 | B2* | 10/2020 | Chen | C22C 9/01 |
| 2016/0251965 | A1* | 9/2016 | Henderkott | F23R 3/002 |
| | | | | 60/752 |
| 2017/0211395 | A1* | 7/2017 | Heffernan | F01D 5/147 |
| 2018/0073390 | A1* | 3/2018 | Varney | F23R 3/002 |
| 2018/0230833 | A1 | 8/2018 | Kush | |
| 2019/0376396 | A1 | 12/2019 | Dierksmeier | |
| 2020/0180016 | A1* | 6/2020 | Fargeas | B22C 9/04 |
| 2020/0254548 | A1* | 8/2020 | Xu | B23K 1/008 |
| 2021/0146463 | A1* | 5/2021 | Fuesting | B23K 35/325 |
| 2021/0205911 | A1* | 7/2021 | Henderkott | B23K 20/24 |
| 2021/0268613 | A1* | 9/2021 | Henderkott | B23K 11/18 |
| 2021/0276118 | A1* | 9/2021 | Henderkott | B23K 11/115 |

OTHER PUBLICATIONS

What is Diffusion Bonding?. Vacco Precision Etched Parts. (Sep. 21, 2021). https://vacco-etch.com/2021/09/10/what-is-diffusion-bonding/#:~:text=Diffusion%20Bonding%20is%20a%20metalworking,leading%20to%20solid%2Dstate%20bonding. (Year: 2021).*

Diffusion bonding for joining dissimilar metals. Aerospace Manufacturing and Design. (2023, Mar. 29). https://www.aerospacemanufacturinganddesign.com/article/diffusion-bonding-for-joining-dissimilar-metals/#:~:text=The%20process%20involves%20applying%20high,a%20range%20of%20aerospace%20applications. (Year: 2023).*

Straub et al., "Performance of Additively Manufactured Internally Cooled Airfoils for Small Industrial Gas Turbines", Turbo Expo: Power for Land, Sea, and Air, vol. 86045, American Society of Mechanical Engineers, Jun. 13, 2022, 14 pp.

* cited by examiner

DUAL-WALLED COMPONENTS FOR A GAS TURBINE ENGINE

TECHNICAL FIELD

The present disclosure relates to dual-walled components of a gas turbine engine.

BACKGROUND

Hot section components of a gas turbine engine may be operated in high temperature environments that may approach or exceed the softening or melting points of the materials of the components. Such components may include various structures and air foils including, for example turbine blades or vane airfoils which may have one or more surfaces exposed to high temperature combustion or exhaust gases flowing across the surface of the component. Different techniques have been developed to assist with cooling of these components, such as application of a thermal barrier coating, construction of the component as a single or dual-walled structure, and passage of a cooling fluid, such as air, across or through a portion of the component to aid in cooling of the component

SUMMARY

The disclosure describes dual-walled components and methods of forming dual-walled components. To provide enhanced mechanical properties, a primary load carrying structural component (referred to herein as a "spar") is formed from a substantially single crystal or directionally solidified (DS) metal alloy. Single crystal or directionally solidified metal alloys may have relatively high strength, ductility, creep resistance, and fatigue resistance compared polycrystalline metal alloys, and may be formed into relatively simple structures using casting processes. These spars can be formed of single crystal alloys, directionally solidified alloys, or equiaxed alloys; however, in many higher temperature applications, these components will be single crystal or directionally solidified alloys. Complex single crystal castings may be capable of being produced via casting, but only through the use of an extremely expensive wax die, and in some cases, complex ceramic cores. The cores and complex wax dies result in very long lead times with low manufacturing yield.

An alternate method of forming the complex airfoil is to separate the outer coversheet from the inner spar and form them individually as castings followed by bonding them together. This may result in dual-walled components formed from two less complex castings and using simplified cores, but that are still relatively difficult to manufacture.

This disclosure focuses on a method to simplify the process of two separate castings followed by bonding even further. The methods described herein form the hot section part (coversheet) using additive manufacturing, thereby alleviating much of the difficulty, cost, and schedule associated with manufacture using a single crystal or directionally solidified casting. To provide a complex cooling pattern, the coversheet is formed from a polycrystalline metal alloy using an additive manufacturing process that does not involve complex wax dies, cores, or template-based manufacturing processes. This coversheet manufactured via additive manufacturing also contains the cooling features/pattern on it. The structural portion (spar) is cast as a simple single crystal or directionally solidified casting. The spar may be diffusion bonded to cooling features/support structures of the coversheet that form the channels of the cooling pattern. As a result, robust dual-walled components may be manufactured with simplified and/or reduced tooling. The complex cooling pattern provides the cooling necessary to enable equiaxed alloys on the lower stressed coversheet. The addition of the complex cooling pattern/features to the coversheet move the bond line to an even lower temperature region thus benefitting mechanical behavior of the bond line.

In some examples, the disclosure describes a dual-walled component of a gas turbine engine that includes a cold section part, such as a spar, and a hot section part, such as a coversheet. The cold section part includes a substantially single crystal or directionally solidified metal alloy and defines an aero contour parallel to an outer surface, a hot section part comprising a polycrystalline metal alloy. The hot section part includes a plurality of support structures forming a plurality of cooling channels and defining an inner surface. The outer surface of the cold section part and the inner surface of the plurality of support structures are diffusion bonded.

In some examples, the disclosure describes method of forming a dual-walled component of a gas turbine engine. The method includes forming, via a casting process, a cold section part from a single crystal or directionally solidified metal alloy. The cold section part defines an aero contour parallel to an outer surface. The method further includes forming, via an additive manufacturing process, a hot section part including a polycrystalline metal alloy. The hot section part includes a plurality of support structures forming a plurality of cooling channels and defining an inner surface. The method further includes joining, via a diffusion bonding process, the outer surface of the cold section part and the inner surface of the plurality of support structures.

The details of one or more examples are set forth in the accompanying drawings and the description below. Other features, objects, and advantages will be apparent from the description and drawings, and from the claims.

DETAILED DESCRIPTION

In general, the disclosure describes techniques for forming dual-walled components, such as dual-walled components for gas turbine engines. Hot section components, such as a flame tube or combustor liner of a combustor and air foils of a gas turbine engine may be operated in high temperature gaseous environments that may approach or exceed the operational parameters for the respective components. To reduce or substantially eliminate the risk of melting the engine components, the component may include a dual-walled structure formed by bonding multiple parts of a component (e.g., a coversheet, spar, and/or support structures of an airfoil) together. The dual-walled structure includes cooling channels that separate a hot section part (referred to herein as a "coversheet") and a cold section part (referred to herein as a "spar") of the dual-walled structure and permit flow of cooling air between the hot and cold section parts. Often, the cooling channels may be formed using template-based methods, such as wax dies, that create negative spaces during casting of the particular part. The templates used in these template-based methods may be complex and difficult to create, limiting their use to large-scale part manufacturing.

According to principles of the disclosure, a dual-walled component of a gas turbine engine includes hot and cold section parts that are manufactured using relatively simple casting and additive manufacturing techniques, respectively, that avoid complex template-based manufacturing processes and enable each part to have mechanical and structural properties that are directed to a particular function of the respective part. The spar is formed from a substantially single crystal or directionally solidified metal alloy that exhibits good mechanical properties, such as high strength and high creep resistance, and has a relatively simple shape that can be formed using a simple casting process. The coversheet is formed from a polycrystalline metal alloy that can be manufactured with a complex cooling pattern of cooling channels using an additive manufacturing process. Additive manufacturing has been developed such that high strength/high temperature alloys can now be used to create structures that have properties similar to alloys that are only castable. An exterior surface of the spar and an inner surface of the support structures of the coversheet are diffusion bonded to form the dual-walled component. The combination of simple casting of high strength spars and on-demand additive manufacturing of complex coversheets may enable fabrication of dual-walled components for a wide range of applications (e.g., design prototypes, rig test hardware/design refinement, and production hardware.

Figure 1:
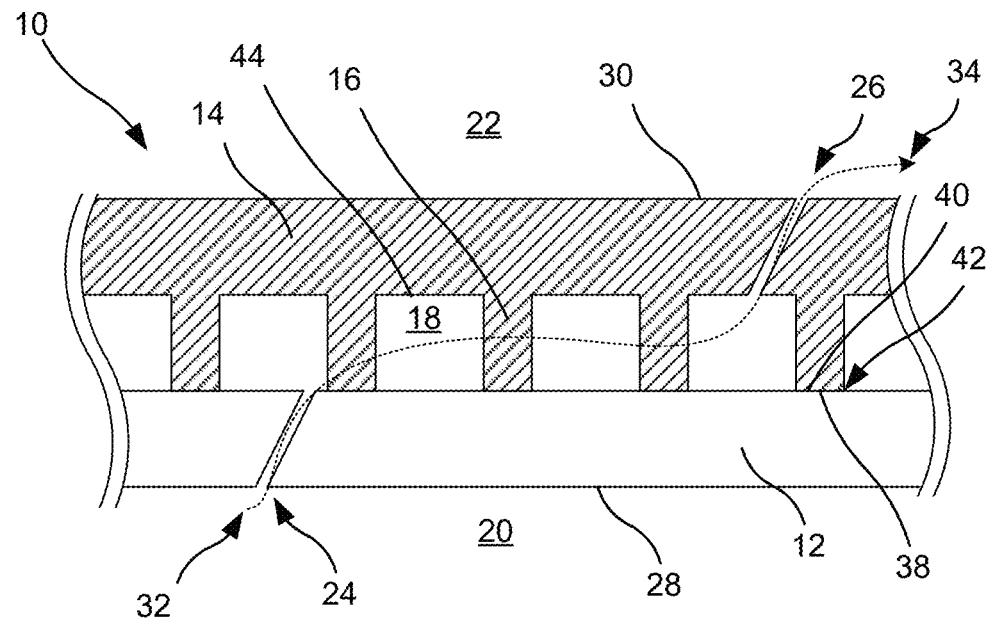
FIG. 1 is a conceptual cross-sectional view of a wall of an example dual-walled component of a gas turbine engine.

FIG. 1 is a conceptual cross-sectional view of an example dual-walled component 10, such as a dual-walled component for a gas turbine engine. In some examples, dual-walled component 10 may be a part for the hot-section of a gas turbine engine (e.g., combustor, turbine, or exhaust sections) that receives or transfers cooling air as part of cooling system for the gas turbine engine. Dual-walled component 10 may include, for example, a component of a combustor such as a flame tube, combustion ring, combustor liner, an inner or outer casing, a combustor guide vane, or the like; a component of a turbine section such as a nozzle guide vane, a turbine disc, a turbine blade, a turbine vane, or the like; or another component associated with the hot section (e.g., a combustor or a high, low, or intermediate pressure turbine) of a gas turbine engine. As mentioned above, and will be discussed further below, component 10 may be fabricated using processes that enable relatively inexpensive and/or quick manufacture. For example, component 10 may be used for bond tooling evaluation, low volume applications, design development iterations, test rigs or test engines, or limited life applications or production engines.

Dual-walled component 10 includes a spar 12 as a cold section part and a coversheet 14 as a hot section part. Dual-walled component 10 may be configured to separate a cooling air plenum 20 adjacent to spar 12 from a heated gas environment 22 adjacent to coversheet 14, such that dual-walled component 10 acts as a physical divider between the two mediums. The terms "hot section part" and "cold section part" are used merely to orient which part is positioned adjacent to cooling air plenum 20 and which part is positioned adjacent to heated gas environment 22 and is not intended to limit the relative temperatures of the different environments or parts. For example, while spar 12 and cooling air plenum 20 may be described herein as "cold" sections compared to hot section part 14 and heated gas environment 22, the respective temperatures of spar 12 or cooling air plenum 20 may reach relatively high temperatures between about 1400° F. to about 2400° F. (e.g., about 760° C. to about 1300° C.) during routine operation, but may remain comparatively cool compared to the temperatures within heated gas environment 22.

Within dual-walled component 10, coversheet 14 includes a plurality of support structures 16 that separate an exterior surface 38 of spar 12 from an interior surface 44 of coversheet 14. The plurality of support structures 16 define an inner surface 40 of coversheet 14, such that inner surface 40 of the plurality of support structures 16 is bonded to exterior surface 38 of spar 12 at a bond interface 42. The plurality of support structures 16 define one or more cooling channels 18 between exterior surface 38 of spar 12 and interior surface 44 of coversheet 14 amongst support structures 16. The presence of cooling channels 18 may create a zoned temperature gradient between the respective regions of cooling air plenum 20, cooling channels 18, and heated gas environment 22. Thus, dual-walled component 10 and the presence of cooling channels 18 may allow for more efficient cooling of the component compared to a comparable single-walled component.

Exterior surface 38 of spar 12 and inner surface 40 of support structures 16 are diffusion bonded. Diffusion bonding is a solid-state joining process that involves application of heat and pressure to cause atoms to diffuse across an interface between two mating surfaces, such as exterior surface 38 and inner surface 40, and form a strong bond. Diffusion bonding may be particularly useful for joining dissimilar materials that may be difficult to weld due to differences in melting points, thermal expansion coefficients, or chemical properties. Bond interface 42 may be characterized by a gradual blending of atoms from the two parts 12, 14, leading to the formation of a strong and metallurgically bonded joint.

Without being limited to any particular theory, in a diffusion bonding process, bond interface 42 between exterior surface 38 and inner surface 40 typically undergoes significant changes as the bonding takes place. Initially, exterior surface 38 and inner surface 40 come into contact with each other under pressure, and may include some roughness and microscopic irregularities. As heat and pressure are applied, atoms from each part 12, 14 begin to diffuse across bond interface 42 into the adjacent material. This diffusion process leads to the intermixing of atoms from both parts 12, 14, resulting in a gradual blending or interdiffusion zone at bond interface 42. Over time, as the diffusion process continues, atomic bonds are formed between the atoms of parts 12, 14. These bonds grow and strengthen as more atoms diffuse across the interface, resulting in the formation of a solid-state bond between parts 12, 14.

Depending on the materials of parts 12, 14 being bonded and any additional potential bonding agents (such as in TLP bonding), intermetallic compounds may form at bond interface 42 due to the diffusion of atoms. These compounds may have different compositions and properties compared to the base materials and may contribute to the overall strength and characteristics of the bond. The final bond interface 42 between spar 12 and coversheet 14 may exhibit a transition zone where the composition gradually changes from one material to the other. This transition zone may be characterized by a gradient in composition, microstructure, and mechanical properties. An extent and nature of this blending may depend on various operation and material parameters such as the potential addition of a bonding agent (TLP bonding), bonding temperature, pressure, time, and the materials being joined.

In some examples, spar 12 includes a substantially single crystal metal alloy. A single crystal metal alloy is a metal alloy that has a single, continuous crystal structure, such that grain boundaries are substantially absent. The absence of grain boundaries and uniformity of crystal structure may result in enhanced mechanical properties compared to polycrystalline metal alloys. For example, the uniformity of the crystal lattice and the absence of grain boundaries reduce diffusion paths for atoms and dislocations which inhibit creep deformation (depending upon orientation), resulting in higher creep resistance; and hinder fatigue crack initiation and propagation, resulting in higher fatigue resistance. Single crystal metal alloys may exhibit anisotropic mechanical properties in which mechanical behavior varies with direction/orientation of the crystal lattice, as the crystal lattice orientation remains uniform throughout the material. Single crystal metal alloys may be used for components where specific mechanical properties such as high strength, creep resistance, and fatigue resistance are important. In some examples, the single crystal metal alloy includes a Ni-based alloy.

In some examples, spar 12 includes a substantially directionally solidified metal alloy. A directionally solidified metal alloy is a metal alloy that has been solidified in a controlled manner to promote the growth of columnar grains in a specific direction. The columnar grains may be elongated and oriented parallel to the direction of solidification, reducing the number of transverse grain boundaries. This directional solidification process may be achieved by moving the alloy through a temperature gradient, causing a solidification front to advance in a preferred direction, and controlling a rate of cooling of the metal alloy. A directionally solidified metal alloy may have improved mechanical properties, such as strength and resistance to creep, particularly at high temperatures. While having substantially improved mechanical properties, directionally solidified metal alloys may be generally less expensive to produce than single crystal metal alloys due to the less stringent manufacturing requirements. In some examples, the directionally solidified metal alloy includes a Ni-based alloy.

In some examples, spar 12 includes an equiaxed metal alloy. Equiaxed metal alloys includes multiple small, randomly oriented crystalline grains having substantially equal dimensions in all directions, resulting in a relatively isotropic microstructure. Each crystal grain includes a multitude of individual crystals or grains that are arranged in a regular lattice structure. This polycrystalline structure of the equiaxed metal alloys may have a significant impact on its properties, such as strength, ductility, and toughness. Without being limited to any particular theory, equiaxed grains may be formed when a metal alloy solidifies from its molten state in a way that allows the crystalline grains to nucleate and grow with similar dimensions in all directions. This can occur under certain solidification conditions, such as when the metal alloy is cooled relatively uniformly or when it is subjected to mechanical agitation during solidification.

Spar 12 may have a relatively simple form. For example, exterior surface 38 may have a smooth surface that is planar, gradually contoured profile, or another form having low localized surface profile complexity. As a result, spar 12 may be capable of being formed through a casting process without complex template wax dies or other inserts for forming structures in exterior surface 38, or with template wax dies that may not involve substantial design (e.g., rapid prototype dies). For example, the complexity may be reduced to the level that a core die and wax die could be easily made by rapid prototyping wax and rapid prototyping core methods for fast make or low volume applications, thereby dramatically lowering the cost and schedule of spars or other cold section parts.

Coversheet 14 includes a polycrystalline metal alloy. Polycrystalline metal alloys include multiple crystalline grains with different orientations. While polycrystalline metal alloys may not have the enhanced mechanical properties of single crystal or directionally solidified metal alloys, polycrystalline metal alloys may be formed using a wide variety of fabrication techniques. In this case, additive manufacturing techniques may be used to produce complex shapes of high temperature polycrystalline alloys. These alloys are approaching the capabilities of polycrystalline alloys that are only capable of being cast (high temperature polycrystalline alloys). For example, the polycrystalline metal alloy may have a relatively high gamma prime content, such as greater than or equal to about 20 volume percent (vol. %). As such, coversheet 14 may be fabricated using additive manufacturing techniques that can be used to quickly design and fabricate a part without complex manufacturing techniques for forming cooling channels 18. In some examples, the polycrystalline metal alloy includes a Ni-based alloy or a Co-based alloy.

Fabricating coversheet 14, including cooling channels 18, with printable high temperature alloys may provide adequate temperature capability for an outer surface of component 10, which is typically more oxidation limited than mechanical property limited. Rather, as described above, spar 12 that includes a simplified design and single crystal or directionally solidified composition provides the structural back bone of component 10, and has the mechanical property requirements that often require single crystal or directionally solidified metal alloys. Additive manufacturing of coversheet 14 only, rather than an entire dual-walled component, may also avoid the need to provide additional support for spar 12 during manufacture. For example, printing of the entire component may require internal support structure in the main body core of an airfoil (spar 12). This support structure may be difficult to remove, and thus add cost and variability to internals of the airfoil. Manufacturing coversheet 14 using additive manufacturing, and subsequently bonding coversheet 14 to spar 12, reduces a need for internal support and minimizes support on external areas of coversheet 14, which may be relatively easy to remove and provide consistent weight and geometry.

In some examples, coversheet 14 may include an equiaxed metal alloy. As discussed above with respect to spart 12, equiaxed metal alloys includes multiple small, randomly oriented crystalline grains having substantially equal dimensions in all directions, resulting in a relatively isotropic microstructure. Equiaxed alloys will have better diffusion and thus should be able to produce metallurgically better bond joints. High temperature (high gamma prime content) alloys typically can only be made by casting and any welding or additive processes normally will cause cracking. Improvements in additive processes and some alloy improvements now are capable of producing Ni-based alloys that have properties very close to the best high temperature equiaxed alloys that can only be made via casting.

Additive manufacturing techniques may be more capable of forming equiaxed metal alloys through control of localized parameters, such as heat input/power density, cooling rate, and solidification conditions, that influence the resulting microstructural features, such as grain size and morphology. For example, using lower power density can result in a uniform high cooling rate that will promote equiaxed grain growth in the deposited material. Some additive manufacturing techniques, such as selective laser melting (SLM) and electron beam melting (EBM), inherently promote equiaxed grain structures due to the localized melting and rapid solidification involved.

Equiaxed metal alloys may be particularly useful when used in conjunction with diffusion bonding at bond interface 42. The equiaxed nature of an equiaxed metal alloy may positively influence diffusion bonding by faster diffusion kinetics due to the presences of grain boundaries, enhancing grain boundary diffusion, reducing residual stresses, and/or promoting microstructural homogeneity, which may contribute to formation of strong and reliable bonds at bond interface 42. Fine equiaxed grains with high boundary density may accelerate diffusion of atoms across bond interface 42, leading to faster bond formation and potentially higher bond strength.

In some examples, additive manufacturing of a polycrystalline metal alloy of coversheet 14 may enable use of wider variety of metal alloys. The temperature at which the deposition or fusion occurs in additive manufacturing can vary depending on factors such as the energy source used (e.g., laser or electron beam), and the process parameters, which allows for a broad range of alloys to be successfully deposited.

To define cooling channels 18, plurality of support structures 16 may take on any useful configuration, size, shape, or pattern. These features are a vital component of the heat exchanger and play a key role in setting the thermal gradient and life of the component. In some examples, the height of plurality of support structures 16 may be between about 0.2 mm and about 2 mm to define the height of cooling channels 18. In some examples, plurality of support structures 16 may include a plurality of columns, spires, pedestals, or the like which are used to separate spar 12 from coversheet 14 and creating a network of cooling channels 18 there between. In some examples, plurality of support structures 16 may also include one or more dams that act as zone dividers between adjacent cooling channels 18, thereby separating one cooling channel 18 from another between spar 12 from coversheet 14. The introduction of dams within dual-walled component 10 may assist with maintaining a more uniform temperature across surface 30 of coversheet 14. In some examples, the pattern of cooling channels 18 may resemble a grid, wave, serpentine, swirl, or the like. In some examples, one or both of coversheet 14 and spar 12 may be formed to define a layer thickness (e.g., in the y-axis direction of FIG. 1) of about 0.014 inches to about 0.300 inches (e.g., about 0.36 mm to about 7.62 mm).

In addition to cooling channels 18, dual-walled component 10 may include other features configured to assist cooling. In some examples, spar 12 includes a plurality of impingement apertures 24 extending through the thickness of spar 12 extending between cooling air plenum 20 and the one or more cooling channels 18, thereby fluidically connecting plenum 20 to cooling channels 18. Similarly, in some examples, coversheet 14 may include a plurality of cooling apertures 26 in surface 30 of coversheet 14 that extend between one or more cooling channels 18 and heated gas environment 22, thereby fluidically connecting environment 22 to cooling channels 18. In some examples, plurality of impingement apertures 24 and cooling apertures 26 (collectively, "apertures 24, 26") may be introduced within respective hot or cold section parts at an angle to the surface of the part (e.g., an offset angle compared to the normal of a respective surface). Apertures 24, 26 may define an angle of incidence of about 19 degrees to about 90 degrees (i.e., with 90 degrees representing the perpendicular/normal to a respective surface). A diameter of apertures 24, 26 may be less than about 0.01 inches to about 0.12 inches in diameter (e.g., about 0.25 millimeters (mm) to about 3 mm). In some examples, cooling apertures may be formed using additive manufacturing techniques, which may reduce a majority of machining and hole drilling operations for coversheet 14 and further reducing the cost.

During operation of dual-walled component 10, cooling air 32 from cooling air plenum 20 may pass through impingement apertures 24 entering and flowing through one or more cooling channels 18 prior to passing through cooling apertures 26 into heated gas environment 22. Cooling air 32 may assist in maintaining the temperature of dual-walled component 10 at a level lower than that of heated gas environment 22. For example, the temperature of the air within cooling air plenum 20 may be less than that of hot gas environment 22. Cooling air 32 may flow through impingement apertures 24 and impinge on the internal surface of coversheet 14, resulting in heat transfer from coversheet 14 to cooling air 32. Additional heat may be transferred from coversheet 14 and plurality of support structures 16 as cooling air 32 flows through one or more cooling channels 18. Further, cooling air 32 may exit cooling apertures 26 and enter heated gas environment 22, creating a thermally insulating film of relatively cool gas along surface 30 of dual-walled component 10 that allows surface 30 of dual-walled component 10 to remain at a temperature less than that of the bulk temperature of heated gas environment 22. In some examples, cooling air 32 may also at least partially mix with the gas of heated gas environment 22, thereby reducing the relative temperature of heated gas environment 22.

In some examples, cooling air 32 may act as a cooling reservoir that absorbs heat from portions of dual-walled component 10 as the air passes through one or more of cooling channels 18, impingement apertures 24, cooling apertures 26, or along one or more of the surfaces of dual-walled component 10, thereby dissipating the heat of dual-walled component 10 and allowing the relative temperature of dual-walled component 10 to be maintained at a temperature less than that of heated gas environment 22.

Cooling air plenum 20 and heated gas environment 22 may represent different flow paths, chambers, or regions within the gas turbine engine in which dual-walled component 10 is installed. For example, in some examples where dual-walled component 10 is a flame tube of a combustor of a gas turbine engine, heated gas environment 22 may include the combustion chamber within the flame tube and cooling air plenum may include the by-pass/cooling air that surrounds the exterior of the flame tube. In some examples in which dual-walled component 10 is a turbine blade or vane, heated gas environment 22 may include the environment external to and flowing past the turbine blade or vane while cooling air plenum 20 may include one or more interior chambers within the turbine blade or vane representing part of the integral cooling system of the gas turbine engine. In such examples, spar 12 may represent the spar of an airfoil (e.g., blade or vane) and coversheet 14 may represent one or more of the coversheets being bonded to the spar.

In some examples, cooling air 32 may be supplied to dual-walled component 10 (e.g., via cooling air plenum 20) at a pressure greater than the gas path pressure within heated gas environment 22. The pressure differential between cooling air plenum 20 and heated gas environment 22 may force cooling air 32 through one or more of the flow paths established by cooling channels 18, impingement apertures 24, and cooling apertures 26 (collectively flow paths 34).

Figure 2:
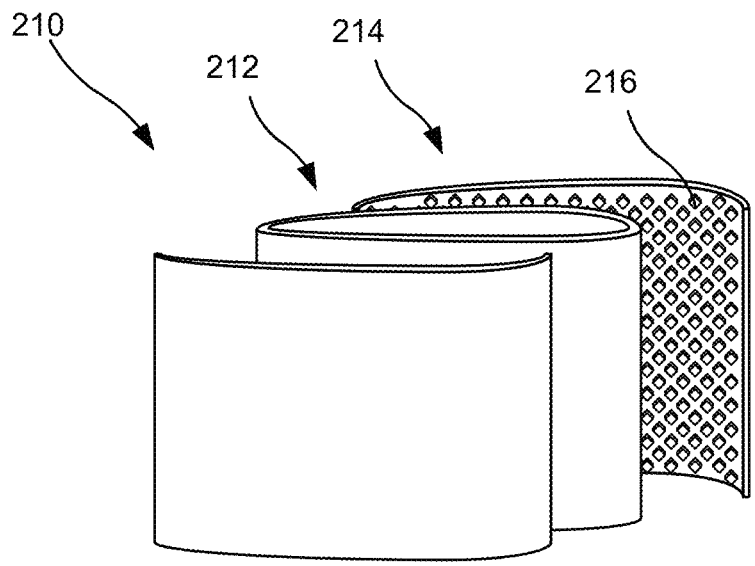
FIG. 2 is a conceptual diagram of an exploded perspective view of an airfoil of a gas turbine engine.

In some examples, dual-walled components described herein, such as dual-walled component 10 of FIG. 1, may include an airfoil, such as a turbine blade. FIG. 2 is a conceptual diagram of an exploded perspective view of an airfoil 210. In the example of FIG. 2, airfoil 210 may include a spar 212 as a cold section part, and a coversheet 214 as a hot section part. Spar 212 and coversheet 214 may work together to provide structural strength, aerodynamic efficiency, and durability to airfoil 210 to withstand the extreme conditions of gas turbine engine operation.

In airfoil 210, such as a turbine blade, spar 212 may be the primary load-bearing structure, and may be configured to withstand centrifugal forces generated by rotation of airfoil 210 and/or aerodynamic forces acting on airfoil 210 during operation. Spar 212 provides structural integrity to airfoil 210, maintaining its shape and resisting deformation under high centrifugal loads and aerodynamic forces. Spar 212 may also serve as a heat sink to dissipate heat generated by combustion or friction.

In contrast, coversheet 214 defines an outer surface of airfoil 210. Coversheet 214 may maintain an aerodynamic profile of airfoil 210 to ensure smooth airflow over the outer surface. Coversheet 214 may be compatible with high temperatures and harsh operating conditions experienced by airfoil 210 in the gas turbine engine environment. Coversheet 214 may also include coatings, such as abradable coatings, thermal barrier coatings, and/or environmental barrier coatings to maintain a low clearance and/or protect the underlying structure from thermal and/or environmental degradation.

Figure 3:
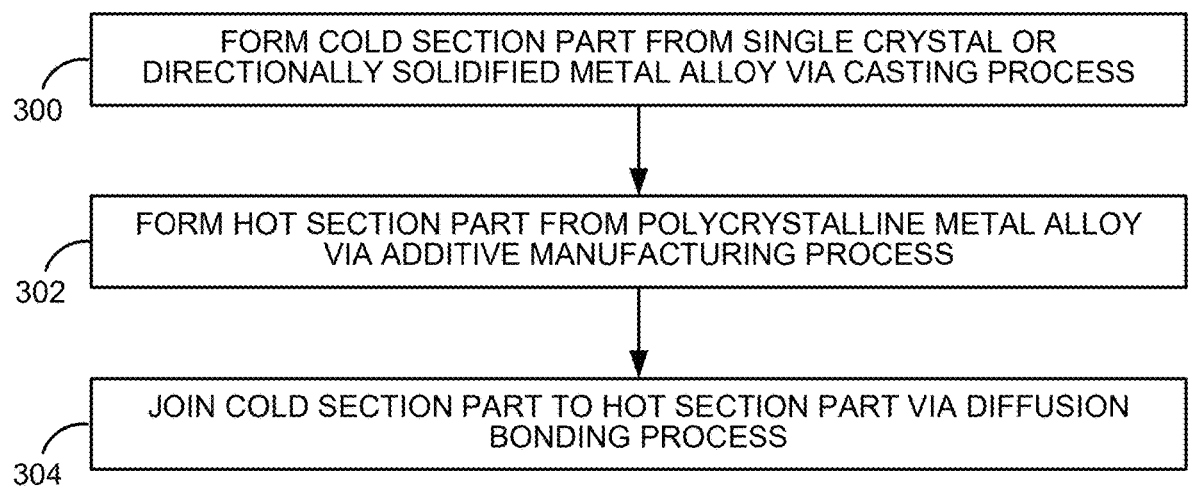
FIG. 3 is a flow diagram illustrating an example technique for forming a dual-walled component of a gas turbine engine.

FIG. 3 is a flow diagram illustrating an example technique for forming a dual-walled component. FIG. 3 will be described with respect to dual-walled component 10 of FIG. 1; however, the technique of FIG. 3 may be used to form other dual-walled components.

The example technique of FIG. 3 includes forming, via a casting process, a spar 12 (300), such that spar 12 includes a single crystal or directionally solidified metal alloy. Such casting may involve precise control over various parameters to promote the growth of a single crystal or directionally solidified structure. For example, a metal alloy may be selected with a composition that exhibits a directional solidification behavior conducive to single crystal formation. A mold for forming spar 12 may be configured with a design to promote directional solidification. The metal alloy may be melted using a method that may promote high purity and heterogeneity, such as by vacuum arc melting, induction melting, or electron beam melting. Once melted and poured in the mold, a cooling rate and temperature gradient of the molten part may be controlled to promote directional solidification of a single crystal. The seed crystal or the orientation-inducing mechanism within the mold may maintain the desired crystallographic orientation throughout the solidification process. After casting, a heat treatment, such as annealing, may be applied to the cooled part to relieve internal stresses, improve mechanical properties, and further refine the microstructure of the single crystal or directionally solidified metal alloy.

In some examples, forming spar 12 may further include machining one or more impingement apertures 24. For example, after spar 12 is casted and generally formed, and prior to bonding spar 12 to coversheet 14, impingement apertures 24 may be formed from plenum 20 to cooling channels 18.

The example technique of FIG. 3 includes forming, via an additive manufacturing process, coversheet 14 (302), such that coversheet 14 includes a polycrystalline metal alloy and a plurality of support structures 16 forming a plurality of cooling channels 18. A computer-aided model of coversheet 14 may be developed, and may be further processed into cross-sectional layers to determine a tool path. Such computer-aided model may include details of the cooling circuit of coversheet 14, including the plurality of cooling channels 18 and/or the plurality of cooling apertures 26. The polycrystalline metal alloy may be selected to include various mechanical and chemical properties suitable for an outer surface of component 10, such as corrosion resistance, mechanical strength, and other properties that may function in combination with mechanical properties of spar 12. For a powder feed additive manufacturing process, the polycrystalline metal alloy may be delivered to a build platform as a powder and selectively heated to cause powder to fuse together or sinter, forming a solidified layer. The fusion process may involve heating the powder to just below a melting point, allowing the powder to bond together while maintaining the overall shape of the section of coversheet 14. After each layer is selectively fused, the previously fused layer undergoes cooling and solidification, which helps to stabilize the structure and prevent warping or distortion. In some examples, such as for equiaxed metal alloys, the heating and cooling may be carefully controlled to ensure relatively uniform grains. The process of selectively fusing is repeated layer by layer until the entire coversheet 14 is fabricated. In some examples, temporary support external support structures may be used to support coversheet 14 and help prevent deformation or collapse of coversheet 14 during printing.

The example technique of FIG. 3 includes joining, via a diffusion bonding process, spar 12 and coversheet 14 (304). For example, exterior surface 38 of spar 12 and inner surface 40 of support structured 16 may be cleaned to remove any contaminants, oxides, or other impurities that could inhibit bonding. Inner surface 40 may be aligned and pressed to exterior surface 38 under controlled condition, such that surfaces 38 and 40 are in intimate contact with each other. Heat and pressure may be applied simultaneously. A temperature used in diffusion bonding may be below the melting point of materials of spar 12 and coversheet 14, but high enough to promote atomic diffusion across the interface. A pressure may ensure intimate contact between the surfaces and facilitate atomic migration. As the materials near surfaces 38 and 40 are heated and pressed together, atoms from each material diffuse across bond interface 42, forming metallurgical bonds between the two materials. This diffusion process occurs at the atomic level, resulting in a strong bond without bulk melting of the materials. After the bonding process is complete, component 10 is allowed to cool under pressure to ensure the formation of a strong bond at bond interface 42. Diffusion bonding may be particularly useful for bonding spar 12 and coversheet 14. For example, diffusion bonding may join dissimilar materials having large differences in melting points and microstructure, and may result in bond interface 42 having high strength and integrity.

Example 1: A dual-walled component of a gas turbine engine includes a cold section part comprising at least one of a single crystal metal alloy or a directionally solidified metal alloy, wherein the cold section part defines an exterior surface; and a hot section part comprising a polycrystalline metal alloy, wherein the hot section part includes a plurality of support structures forming a plurality of cooling channels and defining an inner surface, wherein the exterior surface of the cold section part and the inner surface of the plurality of support structures are diffusion bonded.

Example 2: The dual-walled component of example 1, wherein the dual-walled component comprises an airfoil, wherein the cold section part comprises a spar, and wherein the hot section part comprises a coversheet.

Example 3: The dual-walled component of any of examples 1 and 2, wherein the hot section part further comprises a plurality of cooling apertures extending through the hot section part to the plurality of cooling channels.

Example 4: The dual-walled component of any of examples 1 through 3, wherein the single crystal metal alloy comprises a Ni-based alloy.

Example 5: The dual-walled component of any of examples 1 through 4, wherein the polycrystalline metal alloy comprises a Ni-based alloy or a Co-based alloy.

Example 6: The dual-walled component of example 5, wherein the polycrystalline metal alloy comprises the Ni-based alloy having a gamma prime content of at least about 20 weight percent (wt. %).

Example 7: The dual-walled component of any of examples 1 through 6, wherein the hot section part comprises a plurality of cooling apertures fluidically connecting a heated gas environment to the plurality of cooling channels.

Example 8: The dual-walled component of any of examples 1 through 7, wherein the cold section part comprises a plurality of impingement apertures fluidically connecting a cooling air plenum to the plurality of cooling channels.

Example 9: The dual-walled component of any of examples 1 through 8, wherein the dual-walled component comprises at least one of a flame tube, a combustion ring, a combustor casing, a combustor guide vane, a turbine vane, a turbine disc, or a turbine blade.

Example 10: The dual-walled component of example 9, wherein the dual-walled component comprises a turbine blade.

Example 11: A method of forming a dual-walled component of a gas turbine engine includes forming, via a casting process, a cold section part comprising a single crystal metal alloy, wherein the cold section part defines an exterior surface; forming, via an additive manufacturing process, a hot section part comprising a polycrystalline metal alloy, wherein the hot section part includes a plurality of support structures forming a plurality of cooling channels and defining an inner surface; and joining, via a diffusion bonding process, the exterior surface of the cold section part and the inner surface of the plurality of support structures.

Example 12: The method of example 11, wherein the dual-walled component comprises an airfoil, wherein the cold section part comprises a spar, and wherein the hot section part comprises a coversheet.

Example 13: The method of any of examples 11 and 12, wherein the hot section part further comprises a plurality of cooling apertures extending through the hot section part to the plurality of cooling channels.

Example 14: The method of any of examples 11 through 13, wherein the single crystal metal alloy comprises a Ni-based alloy.

Example 15: The method of any of examples 11 through 14, wherein the polycrystalline metal alloy comprises a Ni-based alloy or a Co-based alloy.

Example 16: The method of example 15, wherein the polycrystalline metal alloy comprises the Ni-based alloy having a gamma prime content of at least about 20 weight percent (wt. %).

Example 17: The method of any of examples 11 through 16, wherein the hot section part comprises a plurality of cooling apertures fluidically connecting a heated gas environment to the plurality of cooling channels, and wherein the plurality of cooling apertures are formed via the additive manufacturing process.

Example 18: The method of any of examples 11 through 17, wherein the cold section part comprises a plurality of impingement apertures fluidically connecting a cooling air plenum to the plurality of cooling channels, and wherein the plurality of impingement apertures are formed via machining.

Example 19: The method of any of examples 11 through 18, wherein the dual-walled component comprises at least one of a flame tube, a combustion ring, a combustor casing, a combustor guide vane, a turbine vane, a turbine disc, or a turbine blade.

Example 20: The method of example 19, wherein the dual-walled component comprises a turbine blade.

Various examples have been described. These and other examples are within the scope of the following claims.

What is claimed is:

1. A dual-walled component of a gas turbine engine, comprising:
   a cold section part comprising at least one of a single crystal metal alloy or a directionally solidified metal alloy having grains in a single orientation, wherein the cold section part defines an exterior surface; and
   a hot section part comprising a polycrystalline metal alloy having grains in multiple orientations, wherein the hot section part includes a plurality of support structures forming a plurality of cooling channels and defining an inner surface,
   wherein the exterior surface of the cold section part and the inner surface of the plurality of support structures are diffusion bonded at a bond interface without a bonding agent to diffuse atoms from each of the cold section part and the hot section part across the bond interface in a single transition zone characterized by a gradient in composition from the cold section part to the hot section part.

2. The dual-walled component of claim 1,
   wherein the dual-walled component comprises an airfoil,
   wherein the cold section part comprises a spar, and
   wherein the hot section part comprises a coversheet.

3. The dual-walled component of claim 1, wherein the single crystal metal alloy comprises a Ni-based alloy.

4. The dual-walled component of claim 1, wherein the polycrystalline metal alloy comprises a Ni-based alloy or a Co-based alloy.

5. The dual-walled component of claim 4, wherein the polycrystalline metal alloy comprises the Ni-based alloy having a gamma prime content of at least 20 weight percent (wt. %).

6. The dual-walled component of claim 1, wherein the hot section part comprises a plurality of cooling apertures fluidically connecting a heated gas environment to the plurality of cooling channels.

7. The dual-walled component of claim 1, wherein the cold section part comprises a plurality of impingement apertures fluidically connecting a cooling air plenum to the plurality of cooling channels.

8. The dual-walled component of claim 1, wherein the dual-walled component comprises at least one of a flame tube, a combustion ring, a combustor casing, a combustor guide vane, a turbine vane, a turbine disc, or a turbine blade.

9. The dual-walled component of claim 8, wherein the dual-walled component comprises a turbine blade.

10. The dual-walled component of claim 1, wherein the polycrystalline metal alloy is an equiaxed metal alloy.

11. The dual-walled component of claim 1, wherein the hot section part is formed via an additive manufacturing process to produce a selectively fused layer by layer structure.

12. The dual-walled component of claim 1, wherein the bond interface consists of atoms of the cold section part, atoms of the hot section part, and any intermetallics formed from the atoms of the cold section part and the atoms of the hot section part.

13. A method of forming a dual-walled component of a gas turbine engine, comprising:
- forming, via a casting process, a cold section part comprising a single crystal metal alloy or a directionally solidified metal alloy, wherein the cold section part defines an exterior surface;
- forming, via an additive manufacturing process, a hot section part comprising a polycrystalline metal alloy, wherein the hot section part includes a plurality of support structures forming a plurality of cooling channels and defining an inner surface; and
- joining, via a diffusion bonding process, the exterior surface of the cold section part and the inner surface of the plurality of support structures at a bond interface without a bonding agent to diffuse atoms from each of the cold section part and the hot section part across the bond interface in a single transition zone characterized by a gradient in composition from the cold section part to the hot section part.

14. The method of claim 13,
wherein the dual-walled component comprises an airfoil,
wherein the cold section part comprises a spar, and
wherein the hot section part comprises a coversheet.

15. The method of claim 13, wherein the single crystal metal alloy comprises a Ni-based alloy.

16. The method of claim 13, wherein the polycrystalline metal alloy comprises a Ni-based alloy or a Co-based alloy.

17. The method of claim 16, wherein the polycrystalline metal alloy comprises the Ni-based alloy having a gamma prime content of at least 20 weight percent (wt. %).

18. The method of claim 13,
wherein the hot section part comprises a plurality of cooling apertures fluidically connecting a heated gas environment to the plurality of cooling channels, and
wherein the plurality of cooling apertures are formed via the additive manufacturing process.

19. The method of claim 13,
wherein the cold section part comprises a plurality of impingement apertures fluidically connecting a cooling air plenum to the plurality of cooling channels, and
wherein the plurality of impingement apertures are formed via machining.

20. The method of claim 13, wherein the dual-walled component comprises at least one of a flame tube, a combustion ring, a combustor casing, a combustor guide vane, a turbine vane, a turbine disc, or a turbine blade.

* * * * *